United States Patent [19]

Llauge et al.

[11] Patent Number: 4,522,225
[45] Date of Patent: Jun. 11, 1985

[54] COCK FOR THE HEATING CIRCUITS OF A VEHICLE

[75] Inventors: Joaquin R. Llauge; Alberto P. Isanta, both of Barcelona, Spain

[73] Assignee: ITW Espana S.A., Barcelona, Spain

[21] Appl. No.: 442,829

[22] Filed: Nov. 18, 1982

[30] Foreign Application Priority Data

Nov. 19, 1981 [ES] Spain .................................. 261579

[51] Int. Cl.³ .............................................. B60P 3/30
[52] U.S. Cl. .................................... 137/351; 251/250;
251/293; 251/351; 251/364; 74/109
[58] Field of Search ............... 251/250, 248, 293, 364,
251/359; 74/109; 137/351

[56] References Cited

U.S. PATENT DOCUMENTS

| 1,214,664 | 2/1917 | Feleki | 251/250 |
| 2,577,260 | 12/1951 | Moore | 251/293 |
| 2,994,340 | 8/1961 | Biello et al. | 251/364 |
| 3,399,862 | 9/1968 | Cerow | 251/293 |
| 3,897,933 | 8/1975 | Christenot | 251/248 |

Primary Examiner—Martin P. Schwadron
Assistant Examiner—Sheri Novack
Attorney, Agent, or Firm—J. R. Halvorsen; T. W. Buckman

[57] ABSTRACT

A valve for vehicle liquid heating circuits that includes a sealed case, an inlet, an outlet and a mechanism for opening and closing at least one of said inlet and said outlet. The valve includes a guide means for mounting a member having a rack thereon and rotatable means with a toothed segment engagable with and actuating the rack along the guide means to move a valve plug into and out of engagement with a seat located at either said inlet or said outlet. A rotatable cylindrical element that includes said toothed segment extends through said sealed casing to accept a lever for actuating the segment to thereby move the rack and its associated plug.

4 Claims, 5 Drawing Figures

COCK FOR THE HEATING CIRCUITS OF A VEHICLE

The present invention refers to a cock for the heating circuits of a vehicle.

A cock for the mentioned purpose is normally comprised of a perfectly sealed casing provided with a first manifold for the outlet of water and a second manifold for the inlet of water. The casing furthermore has means for stably fixing same to the desired spot of the vehicle in question and means for connecting the cable or the like through which the opening and closing mechanism of one of the manifolds is activated.

The invention precisely resides in this mechanism whereby the passage of the water through the casing or cock itself can be opened, closed, as well as adjusted.

Generally the mechanism proportioned by the invention merely comprises two functionally combined parts. One of said parts consists of a rack in which a toothed section pertaining to the other part permanently meshes. The first part or rack has a bend from which there prolongs a cylindrical appendix which is permanently in alignment with the manifold which should close or open said appendix, naturally at the request of the toothed section which rotates back and forth when the part bearing said section is activated by means of the cable which, through the corresponding control, is activated by the user of the vehicle when desired.

To clearly describe both the structure and the functioning of the cock in question, a set of drawings is attached hereto wherein the following is represented.

Figure 1:
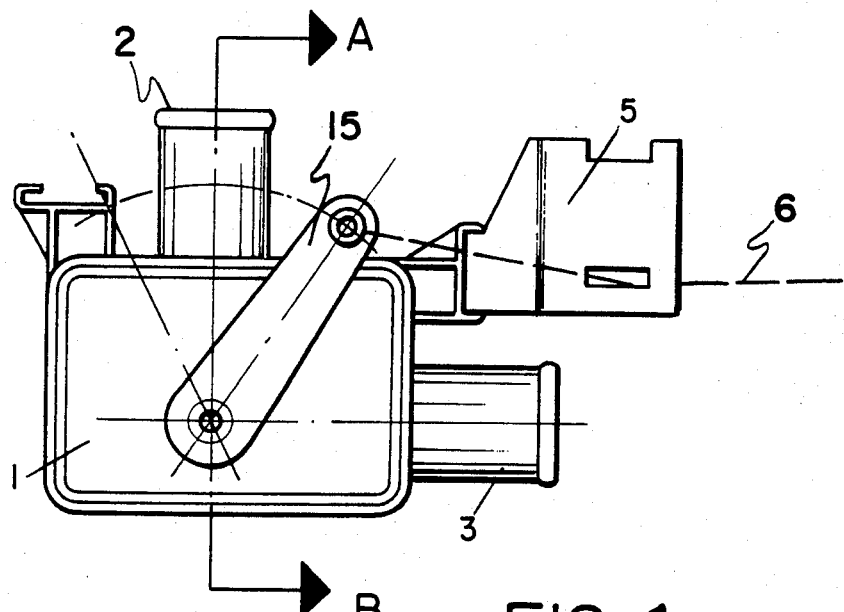
FIG. 1 is a front plan view of the cock for the heating circuits of a vehicle object of the present invention.

In accordance with the aforegoing and referring to the drawings, the cock for the heating circuits of a vehicle, object of the present invention, is comprised of a sealed casing 1 which is provided, in an orthogonal position, with a water inlet manifold 2 and another outlet manifold 3. The casing or cock 1 is complemented with the arrangement of a clip 4 by means of which the cock is fixed to the spot provided therefor in the vehicle and it also has a bent flange 5 to which there is joined the cable or the like 6 which is connected to the lever which should activate the mechanism of the cock.

As previously mentioned, the mechanism is comprised of two functionally combined parts, one of which is provided with the rack 7 while the other is provided with a toothed section 8 which permanently meshes with the rack.

The rack 7 prolongs into an orthogonal bend 9 from which there is axially derived the cylindrical appendix 10 which is always in alignment with the water outlet manifold 3 of the casing 1.

The rack 7, which is cut into one of the longitudinal edges of the flange, has at the posterior face and along the complete length of said body, a groove 11 which fits into a complementary guide 12 provided on the inner face of the bottom of the casing 1, to establish a guide system for the rack during the back and forth movements thereof proportioned by the toothed section 8.

The toothed section 8 prolongs into a cylindrical appendix 13 emerging from the casing 1 to be connected, through its faceted end 14, to the lever 15 which, as previously mentioned, establishes connection with the activating cable 6. The faceted end 14 of the cylindrical appendix 13 has a zone having a small diameter to receive the adjustment of an O-seal 16 which establishes the necessary sealing in this zone of the casing 1 which is traversed by the mentioned cylindrical appendix 13.

The bottom of the casing 1, besides the mentioned guide 12 which acts as a guide for the rack 7, is provided with a depression 17 forming a housing for the toothed section 8, said depression 17 having another circular countersunk 18 acting as the pivoting zone for the second part.

Within the structure of this second part, it should be pointed out that above the toothed section 8 there has radially been provided a type of circular wing 19 which constitutes a positioning front for the rack 7, that is, the purpose of this section or radial wing 19 is to prevent the rack 7 from moving out of its guide 12.

The structure of the described cock is complemented by a sealing washer 20 which is stably housed in correspondence with the mouth of the water outlet manifold 3. The hole of this washer 20 has a perimetral lip which precisely fits into this water outlet manifold 3, and which forms a seat for the pivot 10 which, in short, is the valve for opening and closing this manifold 3.

Figure 4:
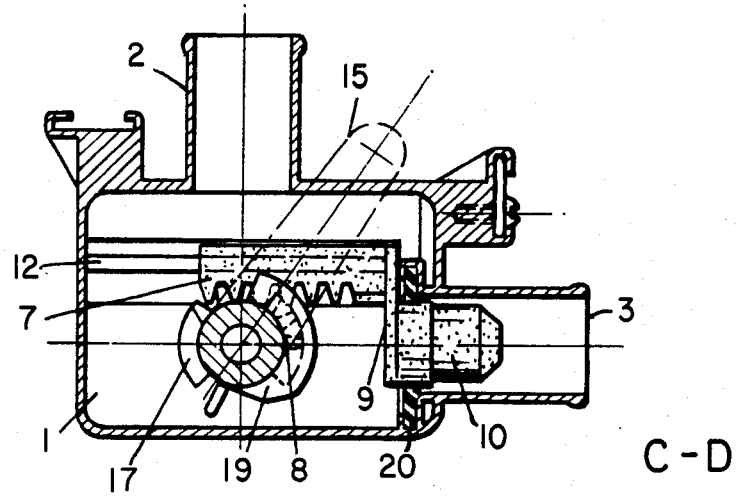
FIG. 4 is another section of the cock along the line C-D of FIG. 2.

Functioning of the cock for the heating circuits of a vehicle, object of the present invention, can practically be deduced from the described structure. In fact, if we take into consideration the position of the lever 15 which activates the mechanism as illustrated in FIG. 1 and with discontinuous dotted lines in FIG. 4, it can be seen that the rack 7 is moved completely to the right, whereby the cylindrical appendix or valve 10 is introduced into the water outlet manifold 3. This position constitutes the closure of said manifold inasmuch as the section of the cylindrical appendix having a larger diameter fits with relative pressure into the hole of the sealing washer 20, and more specifically also in the perimetral lip of the hole of said washer.

Figure 2:
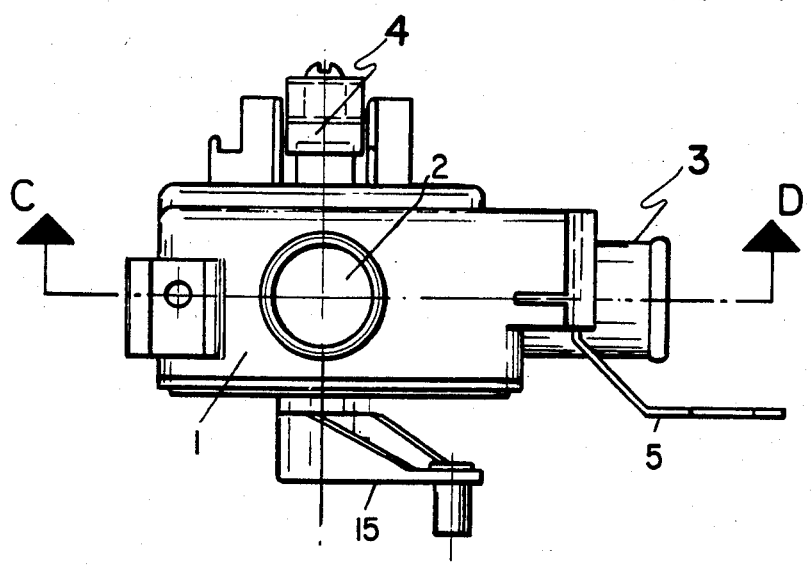
FIG. 2 is a profile view of said cock departing from the position illustrated in FIG. 1.
Figure 3:
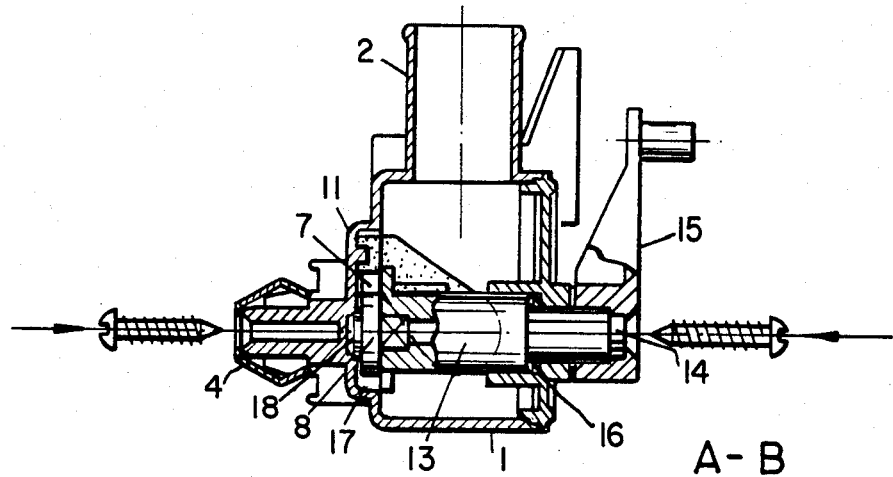
FIG. 3 is a cross-section elevational view along the line A-B of FIG. 1.
Figure 5:
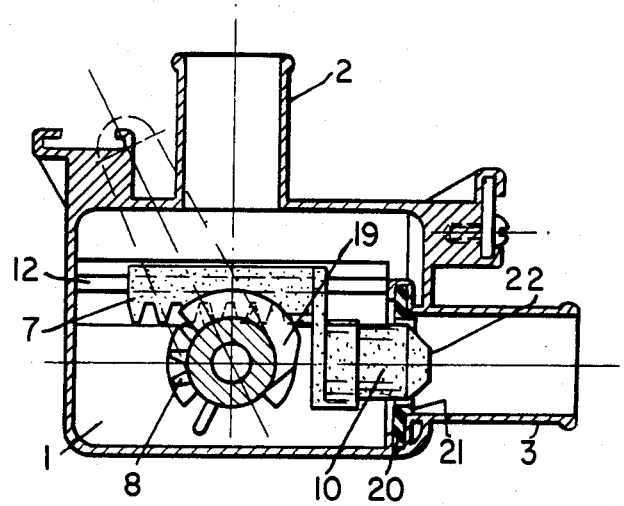
FIG. 5 is a section of the cock, similar to that represented in FIG. 4, but with another relative position of the parts forming the already mentioned mechanism.

When the cable 6 is activated, the lever 15 is angularly moved to an end position, that is, to the position opposite to that represented in FIG. 1 and in FIG. 2, whereby there is achieved the displacement of the rack 7 and, consequently, the appendix 10, same being in the position illustrated in FIG. 5 which corresponds to the complete opening of the water outlet manifold 3, which penetrates into the casing 1 and is channalized through the inlet manifold 2.

Between these two end positions of the lever 15, there can be an infinite number of intermediate positions, whereby the amount of water entering the casing is adjusted and, in short, the discharge thereof towards the heating circuit can, consequently, acquire different temperatures.

We claim:

1. A liquid valve for the liquid heating circuits of a vehicle, including a sealed case having means communicating between its interior and exterior including a liquid inlet and a liquid outlet, means for mounting the valve on said vehicle, a mechanism for opening and closing at least one of said inlet and said outlet, said case including a planar wall of substantial extent carrying guide means generally parallel to one of said communicating means, a member having a rack thereon movable along said guide means and carrying a valve plug capable of closing off a seat in said one communicating means, a rotatable means carried adjacent said planar wall and having a toothed segment engageable with and actuating said rack along said guide means thereby moving said valve plug into and out of engagement with said seat, sealed means communicating through said case and cooperating with external actuating means to rotate said rotatable means to thereby open and close said valve by movement of said rack linearly within said case, said rotatable means having a generally cylindrical element including said toothed segment with a coaxial cylindrical appendage extending from one end and journaled in a mating recess in said planar wall, a rotatable shaft at one end and nonrotatably connected to said element while serving as said sealed means and emerging from the casing to receive at its opposite faceted end said external actuating means in the form of a lever connected at one end to said shaft and at the opposite end to an activating means such as a cable, said opposite end of said shaft being furthermore recessed to receive an o-ring seal.

2. A valve for the heating circuits of a vehicle according to claim 1, characterized in that the said member having a rack includes a longitudinal flange with teeth cut in the longitudinal edge of said flange, the complete length of an adjacent face of said flange has a groove which fits into said guide existing in the inner face of said case.

3. A valve for the heating circuits of a vehicle according to claim 1, characterized in that parallel to the toothed segment of said cylindrical element and spaced axially from same, said element is provided with a circumferentially disposed wing in the form of a circular flat uninterrupted segment which constitutes a moveable wall positioned parallel to and in front of the rack on its guide, thereby serving as a barrier to insure that said rack remains on said guide.

4. A valve for the heating circuits of a vehicle according to claim 1, characterized in that the seat of said communicating means to which said valve plug is aligned includes a rubber washer, the hole of said washer having an inwardly directed perimetral lip which extends into said seat and sealingly grips said valve plug.

* * * * *